(12) United States Patent
Magnano et al.

(10) Patent No.: US 11,271,359 B2
(45) Date of Patent: *Mar. 8, 2022

(54) LASER SOURCE, PARTICULARLY FOR INDUSTRIAL PROCESSES

(71) Applicants: Comau S.p.A., Grugliasco (IT); Prima Electro S.p.A., Moncalieri (IT)

(72) Inventors: Nunzio Magnano, Grugliasco (IT); Maurizio Gattiglio, Moncalieri (IT); Andrea Braglia, Turin (IT)

(73) Assignees: Comau S.p.A., Grugliasco (IT); Prima Electro S.p.A., Moncalieri (IT)

(*) Notice: Subject to any disclaimer, the term of this patent is extended or adjusted under 35 U.S.C. 154(b) by 651 days.

This patent is subject to a terminal disclaimer.

(21) Appl. No.: 16/082,012

(22) PCT Filed: Mar. 13, 2017

(86) PCT No.: PCT/IB2017/051437
§ 371 (c)(1),
(2) Date: Sep. 4, 2018

(87) PCT Pub. No.: WO2017/158488
PCT Pub. Date: Sep. 21, 2017

(65) Prior Publication Data
US 2020/0295524 A1  Sep. 17, 2020

(30) Foreign Application Priority Data

Mar. 14, 2016 (IT) .................... 102016000026549

(51) Int. Cl.
*H01S 3/00* (2006.01)
*H01S 3/106* (2006.01)
(Continued)

(52) U.S. Cl.
CPC .......... *H01S 3/106* (2013.01); *H01S 3/06754* (2013.01); *H01S 3/08009* (2013.01);
(Continued)

(58) Field of Classification Search
CPC .. H01S 3/094096; H01S 3/2308; H01S 3/106; H01S 3/06754; H01S 3/094053;
(Continued)

(56) References Cited

U.S. PATENT DOCUMENTS 8,958,144 B2  2/2015 Rataj et al.
9,929,528 B2 *  3/2018 Magnano ............ H01S 3/06754
(Continued)

FOREIGN PATENT DOCUMENTS

EP  000723323 A2 *  7/1996  ............... H01S 3/25
EP  1848073 A1  10/2007
(Continued)

*Primary Examiner* — Mark Hellner
(74) *Attorney, Agent, or Firm* — Young Basile Hanlon & MacFarlane, P.C.

(57) ABSTRACT

A laser source for industrial operations including a first laser outlet and a second laser outlet. The laser source is switchable to selectively provide at the first laser outlet a high beam quality and relative low power or at the second laser outlet with a higher power and lower beam quality to better accommodate the particular process. In one example, a selector addressing unit includes movable mirrors to selectively direct the generated laser beams to either the first laser outlet or the second laser outlet. In another example the laser source is used in an industrial plant to provide laser beams to a plurality of processing cells. The laser source operable to selectively provide a laser beam having desired or optimum qualities for the particular processing cell.

12 Claims, 8 Drawing Sheets

(51) Int. Cl.
  *H01S 3/067* (2006.01)
  *H01S 3/08* (2006.01)
  *H01S 3/094* (2006.01)
  *H01S 3/0941* (2006.01)
  *H01S 3/23* (2006.01)

(52) U.S. Cl.
  CPC .... *H01S 3/09415* (2013.01); *H01S 3/094053* (2013.01); *H01S 3/094096* (2013.01); *H01S 3/2308* (2013.01)

(58) Field of Classification Search
  CPC ............. H01S 3/08009; H01S 3/09415; H01S 3/0071; H01S 3/0941; H01S 3/005; H01S 3/2391; G02B 27/141
  See application file for complete search history.

(56) References Cited

U.S. PATENT DOCUMENTS

| | | |
|---|---|---|
| 2005/0281102 A1 | 12/2005 | Bruland |
| 2006/0187973 A1 | 8/2006 | Varnham et al. |
| 2007/0164005 A1 | 7/2007 | Matsuda et al. |
| 2007/0229939 A1* | 10/2007 | Brown ................ G02B 27/108 359/341.1 |
| 2008/0253419 A1 | 10/2008 | Feklistov |
| 2014/0177038 A1 | 6/2014 | Rrataj et al. |

FOREIGN PATENT DOCUMENTS

| | | |
|---|---|---|
| EP | 3001517 A1 | 3/2016 |
| WO | 2010083566 A2 | 7/2010 |

\* cited by examiner

LASER SOURCE, PARTICULARLY FOR INDUSTRIAL PROCESSES

FIELD OF INVENTION

The present invention relates to laser sources and in particular to laser sources of the type usable for industrial processes, for example for welding, brazing and cutting of metallic materials.

BACKGROUND

In the past, many types of laser sources have been developed, and are currently commercially available, configured to meet different needs in the field of industrial processes, and in particular in the field of processing of metallic materials. In general, different types of processing (such as welding, brazing and cutting of metallic materials), different degrees of precision in the processing and different characteristics of the materials to be treated (for example, different values of thickness of the metal sheet to be welded or to be cut) require different characteristics of the laser beam in order to ensure optimal results. For some of these processes, the level of "quality" of the laser beam can be lower, while for other applications the beam quality must be higher.

In the present description, and in the claims that follow, "quality" of the laser beam means the ability of the laser beam to be focused into a very small spot, so as to result in a high power density on that spot. The quality of the laser beam defined as such is commonly represented by the value of the parameter BPP ("Beam Parameter Product"), measured in millimeters per milliradians (mm·mrad), corresponding to the product of the laser beam divergence half-angle and the beam diameter at its narrowest point (beam waist). The quality of the laser beam increases as the value of the BPP decreases. Therefore, various industrial applications may require the use of laser beams with very different values of the BPP. Similarly, the power of the laser beam can also be varied, depending on the specific applications.

In many known types of laser sources, it is possible to vary, to a very limited extent, the quality and power of the laser beam without, however, any possibility of significantly modifying these characteristics. For this reason, it is currently often necessary to provide different laser sources to perform different industrial operations.

It is, therefore, desirable to provide a single "universal" type of laser source, which can be easily adapted according to the nature of the industrial operation to be performed and/or the nature of the materials to be treated.

Among the various types of laser source already developed and commercially available, the diode laser sources and laser sources with active optical fiber should be particularly remembered. The latter comprise optical fibers in which an "active" material is dispersed (typically a rare earth material) that has the ability to amplify a light beam by exploiting the stimulated emission principle. Typically, the active optical fiber is "pumped" with a laser beam generated by a diode laser source. The active optical fiber laser sources generally produce a higher beam quality compared to the diode sources, but at the same time give rise to a loss of power due to the dispersion within the optical fiber.

FIG. 3 of US Patent Application Publication US 2014/0177038 shows a laser device with dual brilliance, with a fiber-integrated optical beam switch, able to switch the laser beam between two optical fibers, one of which is connected to a first outlet, and the other being connected to an ytterbium fiber oscillator, which feeds a fiber outlet with an oscillation having a higher brilliance.

SUMMARY

The object of the present invention is that of producing a laser source capable of selectively generating laser beams with different characteristics, so that it can be used in very different industrial applications.

A further object of the present invention is to achieve the above aim with a laser source having a simple and functional structure.

A further object is to provide a laser source switchable between two different outlets with different powers and qualities of the emitted laser beam, in which the outlet with a higher power still has a good beam quality.

A further object is to produce a plant with a plurality of laser processing devices or laser processing cells, or laser processing stations by advantageously and efficiently utilizing one or more laser sources of the type indicated above.

In view of achieving the aforesaid objects, the present invention relates to a laser source. The source according to the invention comprises a laser beam generating unit, including a plurality of laser diodes for generating a plurality of laser beams. The source also comprises an optical amplification unit, including a plurality of amplifier modules configured to be pumped with said laser beams emitted by said diodes and to emit outgoing laser beams having a higher beam quality and a lower power value with respect to said laser beams emitted by said diodes. Between said generating unit and said optical amplification unit, an optical switching and addressing unit of the laser beams emitted by said diodes is interposed. Said optical switching and addressing unit includes a plurality of inlets for receiving said laser beams emitted by said diodes, a first optical line to forward a single laser beam produced from said laser beams towards a first outlet of said laser source, and a plurality of second optical lines to forward said laser beams emitted by said diodes towards said amplifier modules of said optical amplification units. The amplifier modules have their respective outlets connected to optical lines all converging towards a second outlet of said laser source. The optical switching and addressing unit comprises an optical path selecting device for selectively directing said laser beams emitted by said diodes towards said first optical line or towards said second optical lines. When the first laser beams are directed towards said first optical line, a single laser beam is generated with a relatively higher power and a relatively lower quality at said first outlet of said laser source. When the laser beams are directed toward said second optical lines, the laser beams are fed through said amplifier modules, the outlets of which are connected to said second outlet of the laser source, so as to generate the emission of a single laser beam with a relatively lower power and a relatively higher quality at said second outlet of the laser source.

Still according to the invention, the aforesaid diodes are configured to emit laser beams having different wavelengths from each other. The aforesaid selector device of the optical switching and addressing unit has a first operating position in which it forwards said laser beams towards said second optical lines, and a second operating position in which said laser beams with different wavelengths are made to converge into a single beam, in a condition in which said laser beams emitted by said diodes are at least partially overlapping with each other.

Thanks to these characteristics, the laser beam according to the present invention is switchable between a first outlet with high beam quality and relatively lower power, and a second outlet with higher power and lower quality. However, the beam quality at the outlet of higher power is also relatively high, thanks to the possibility of converging laser beams of different wavelengths into a single beam, making them overlap, at least partially, with each other.

In a preferred embodiment, said selector device comprises a series of mirrors aligned along the direction of said first optical line and jointly movable between a first position in which they intercept said laser beams emitted by said diodes and a second position in which said mirrors do not intercept said laser beams, so that the latter may proceed towards said second optical lines and towards said amplifier modules. In this embodiment, in the aforesaid first intercepting position, the first of said mirrors reflects one of said laser beams in the direction of said first optical line and through the other mirrors, while each of the remaining mirrors is arranged to reflect the laser beam emitted by a respective diode, and having a respective wavelength, and to be permeable instead to laser beams with other wavelengths directed through it by other mirrors of said series of mirrors. Each of said mirrors subsequent to the first is therefore only reflective for the wavelength of a respective laser beam.

In an alternative embodiment, said selector device comprises a diffraction grating movable between a first position towards which said laser beams emitted by said diodes are made to converge, and a second position in which said diffraction grating does not intercept said laser beams, which can then proceed towards said second optical lines and towards said amplifying modules. In this embodiment, in the aforesaid first position of interception of the diffraction grating, said laser beams emitted by said diodes are diffracted in the direction of said first optical line.

As is evident, the invention makes a single laser source available, which has a first outlet and a second outlet, distinct from each other, which are selectively activated to emit laser beams with different powers and qualities, depending on the particular application of interest.

It is therefore possible, for example, to equip a processing cell in an industrial plant with a single laser source that can perform processing of different natures, within the same processing cycle, in the cell, and/or that makes the future introduction of a new processing cycle-, within the same cell, possible, without the need for replacing the laser source and/or where it is also possible, for example, for the same laser source to be used, both to perform different types of processing in the same processing cell and to perform different processes in different processing cells, as well as acting as a dedicated source in a first processing cell and a back-up source in another processing cell.

The movement of the selector mirror of the optical path is controlled by an actuator device of any known type, preferably electrically-operated.

BRIEF DESCRIPTION OF THE DRAWINGS

Further characteristics and advantages of the invention will become apparent from the description that follows with reference to the attached drawings, provided purely by way of non-limiting example, wherein.

DETAILED DESCRIPTION

Figure 1:
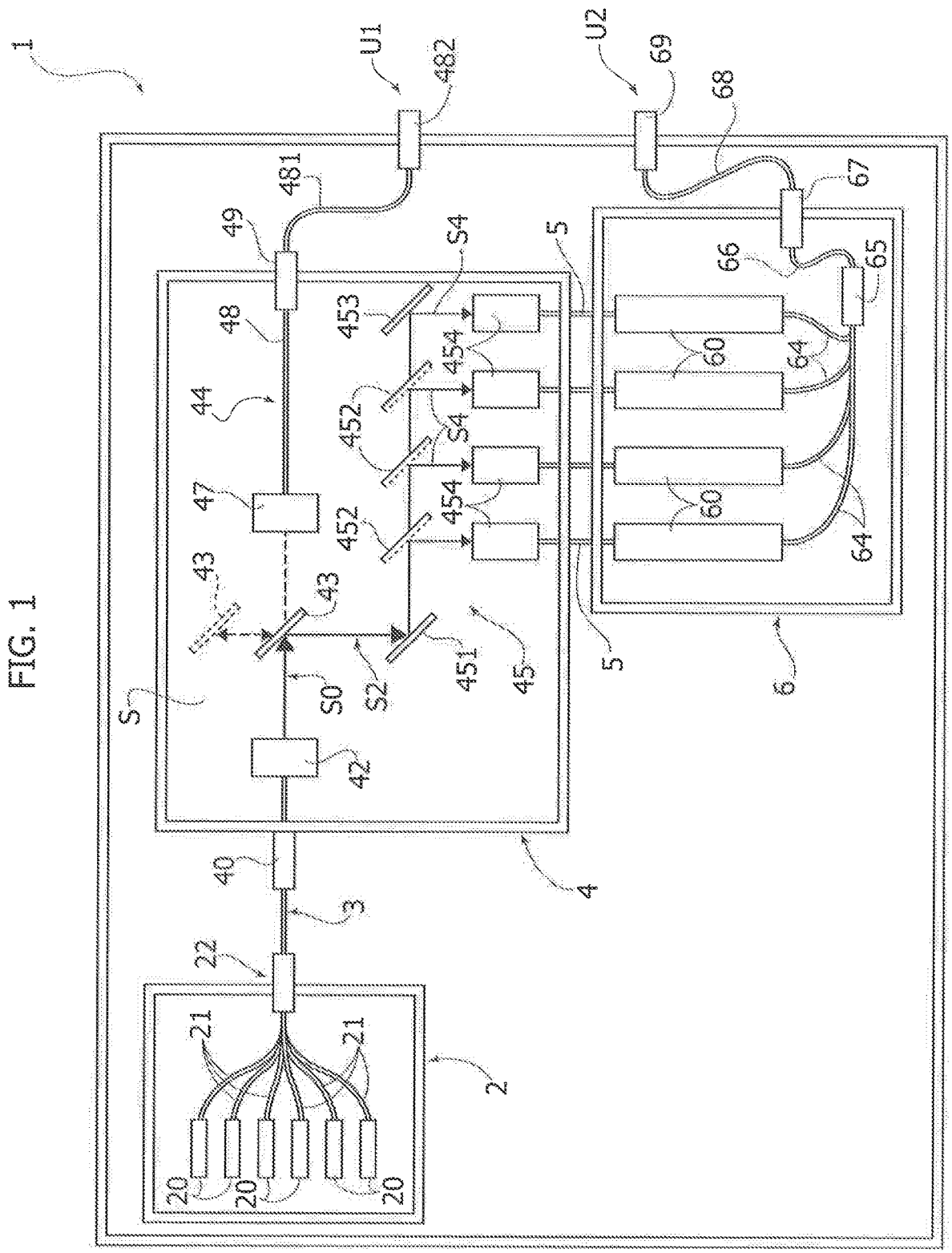
FIG. 1 is a diagram of an embodiment of a laser source with two outlets that is not part of the present invention, as it is already the subject of Italian patent application 10 2014 902 296 586.

With reference to FIGS. 1-4, the numeral 1 indicates, in its entirety, a laser source for use in industrial processes, in particular on metallic materials, which is already the subject of Italian patent application 10 2014 902 296 586 filed Sep. 26, 2014, filed by the same Applicant. The laser source of FIG. 1, as well as the laser source of the present invention, is, for example, usable in an industrial cell in which various types of operations are performed, such as laser welding operations, laser brazing operations and/or laser cutting operations.

Many of the components forming part of the embodiments described here are only illustrated schematically in the attached drawings, since each of them, considered independently, can be produced in any known manner. The elimination of the construction details from the drawings also renders the drawings simpler and easier to understand.

With reference to FIGS. 1-4, the laser source 1 comprises a laser beam generating unit, indicated, in its entirety, with the reference number 2. The generating unit 2 comprises a plurality of diode laser sources 20 produced in any known way. The laser light coming from the diode laser sources 20 is conveyed in the optical fibers 21 that converge into a combiner of fibers 22, also of known type, the outlet of which is connected to an optical fiber 3.

In one example of an embodiment, the generating unit 2 is able to generate a first laser beam in the optical fiber 3, having a power in the order of 6 kW, and a beam quality corresponding to a BPP in the range of 50 mm·mrad.

Figure 3:
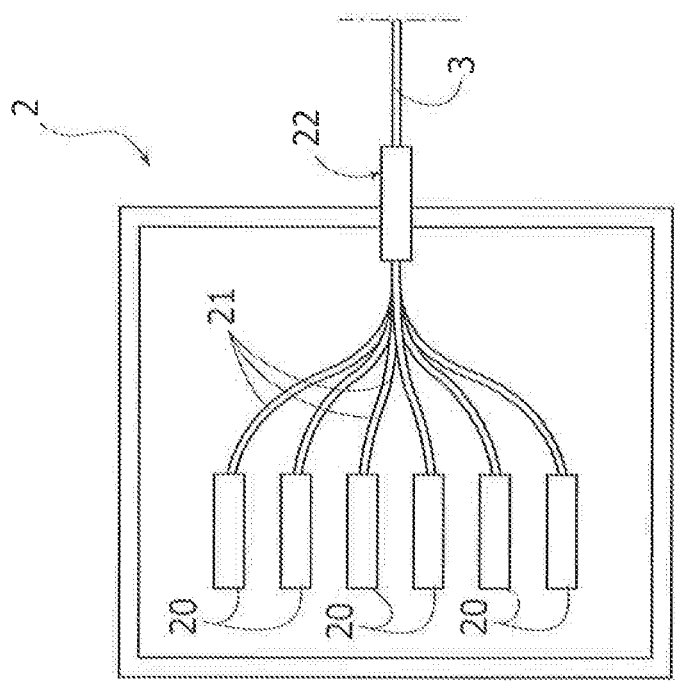

Of course, the configuration of the generating unit 2 shown schematically in FIG. 1, and also visible on an enlarged scale in FIG. 3, is provided here purely by way of example, being evident to those skilled in the art that such a generating unit 2 can be implemented according to any of the presently known architectures provided for diode laser sources.

Figure 2:
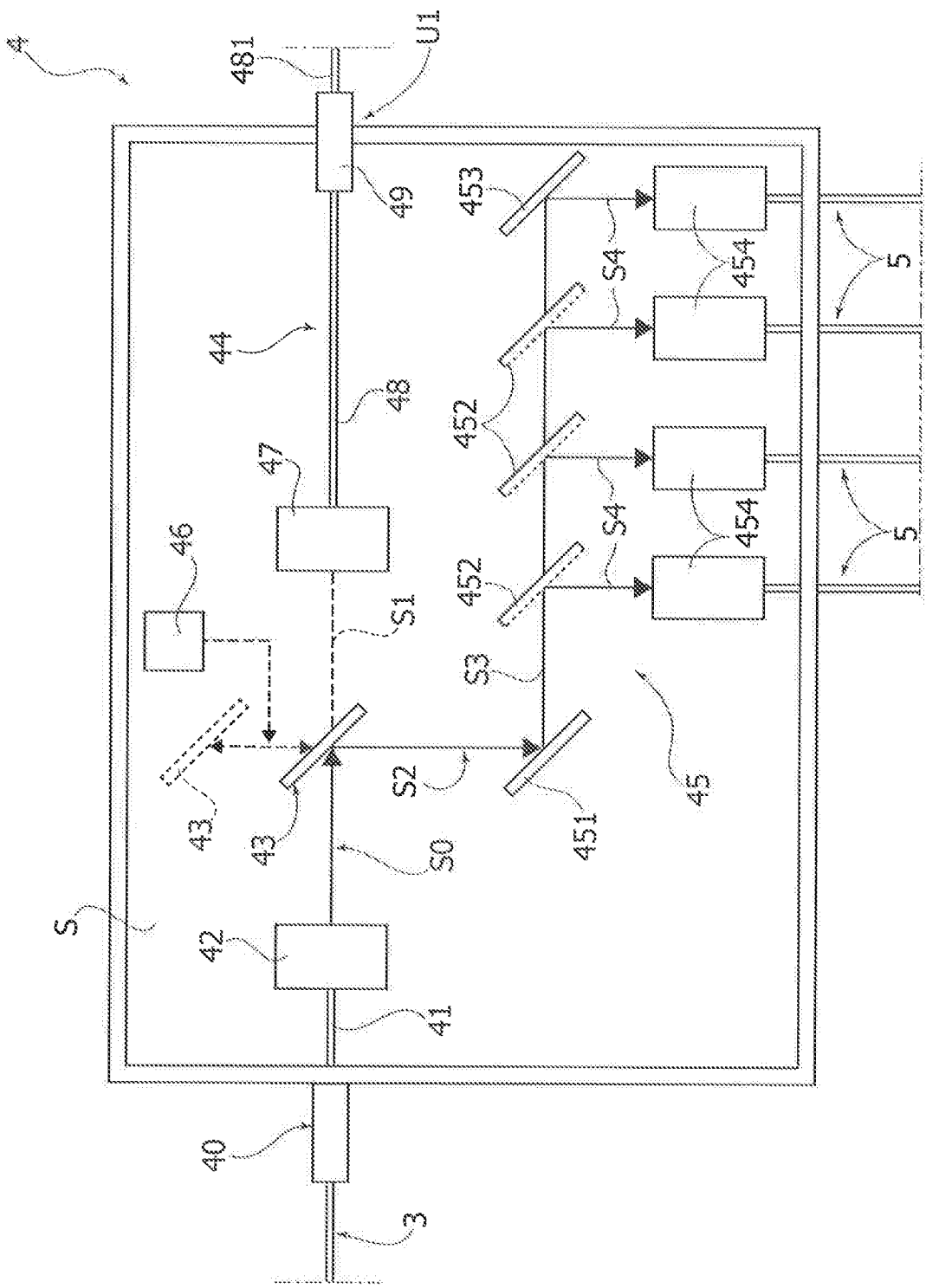
FIGS. 2-4 are diagrams on an enlarged scale of some components of the diagram of FIG. 1.
Figure 4:
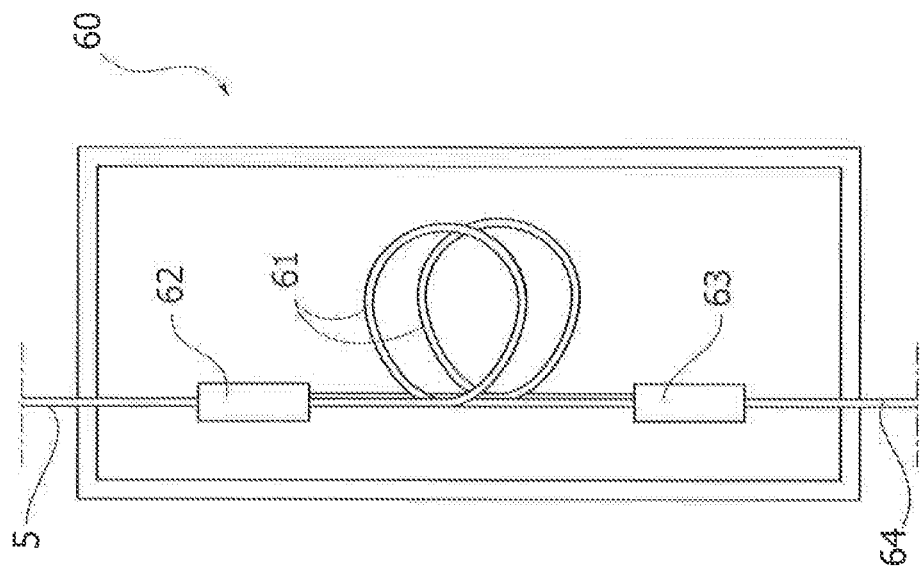

Downstream of the generating unit 2, the laser source 1 according to the present invention comprises an optical switching and addressing unit 4 of the laser beam. With reference to FIG. 2 as well, the unit 4 comprises an inlet constituted by a connector 40 to which the optical fiber 3 coming from the generating unit 2 is connected. The connector 40 connects the optical fiber 3 to an optical fiber 41, an inlet of the unit 4. An optical interface 42, of any known type, transmits the laser beam coming from the generating unit 2 through the optical fibers 3 and 41 within a free space S provided within the housing of the unit 4, in which the laser beam propagates freely.

In the space S within the unit 4, an optical path selector device is arranged, which in the example illustrated here consists of a mirror 43. In the illustrated example, the mirror 43 is displaceable parallel to itself between a first operating position (illustrated with a dashed line in FIGS. 1 and 2) and a second operating position (illustrated with a solid line).

In the first operating position of the mirror 43, the mirror does not intercept the laser beam coming from the generating unit, so that the laser beam can pass freely in the direction of a first optical line, indicated, in its entirety, by the reference number 44, which is headed by a first outlet U1 (see FIG. 1) of the laser source according to the invention. In its second operating position, the mirror 43 intercepts the laser beam coming from the generating unit and reflects it in the direction of a second optical line, indicated, in its entirety, by the reference 45.

As also already indicated above, as an alternative to the arrangement shown schematically here for the mirror 43, it is possible to provide an arrangement in which the mirror is simply made to oscillate between a first operating position and a second operating position, in such a way that in both positions, the mirror intercepts the laser beam coming from the generating unit, reflecting it in the direction of two different optical lines.

Still with reference to FIG. 2, the reference number 46 indicates an actuator of any known type, preferably electrically-controlled, configured to control the movement of the mirror 43 between its two operating positions. When the mirror 43 is in its first operating position (shown by dashed lines) in which it does not intercept the laser beam coming from the generating unit according to a direction S0, this beam continues in the free space S according to a direction S1 (constituting the prolongation of direction S0) until entering into an optical interface 47, through which the laser beam is conveyed in an optical fiber 48. The optical fiber 48 terminates in a connector 49 through which it is connected to a further optical fiber 481, which is headed by a connector 482 (see FIG. 1) that constitutes the first outlet U1 of the laser source 1 according to the present invention.

Still with reference to FIG. 2, when the mirror 43 is in its second operating position (shown with a solid line), the laser beam coming from the generating unit according to the direction S0 impacts on the mirror 43 and is consequently reflected according to a direction S2 in the direction of the second optical line 45.

In the case of the specific embodiment illustrated here purely by way of example, the second optical line 45 comprises a fixed mirror 451, which reflects the laser beam coming from the direction S2 in a direction S3. The laser beam that proceeds along the direction S3 meets, in succession, a plurality of fixed semi-reflecting mirrors 452 and a totally reflecting fixed end mirror 453. The semi-reflective mirrors 452 are shaped in such a way that the laser beam which impacts on them is partly reflected along a direction S4 and partly continues beyond the mirror, according to the direction S3. The end mirror 453 reflects the portion of light that has passed all the semi-reflective mirrors 452. The beam portions reflected according to the directions S4 are conveyed by means of respective optical interfaces 454 within a plurality of outgoing optical fibers 5 from the unit 4.

Still with reference to FIG. 1, the optical fibers 5 conduct the laser light to the inlets of a plurality of amplifier modules 60 of an optical amplification unit 6. Each of the amplifier modules 60 has a configuration of the type shown in FIG. 4, in itself of a known type, comprising "active" optical fibers 61 within which particles of active materials are dispersed (ytterbium in the specific example shown), which have the ability to amplify the incident laser beam by exploiting the stimulated emission principle. Still according to a prior art, the active optical fibers 61 extend between two Bragg gratings 62, 63, arranged at the inlet and outlet of each module 60 and connected, respectively, to the inlet optical fiber 5 and to an outlet optical fiber 64. The outlet optical fibers 64 converge into a combiner of optical fibers 65 whose outlet is connected via an optical fiber 66, a connector 67 and a further optical fiber 68 (see FIG. 1), to a connector 69 constituting a second outlet U2 of the laser source 1 according to the invention.

The active optical fibers 61 of the amplifier modules 60 are optically pumped with laser light coming from the laser sources 4 and derived from the diodes 20 and give rise to a laser beam at the second outlet U2, having different characteristics with respect to the laser beam available at the first U1 outlet. In particular, the passage through the active fibers 61 involves a power loss (for example, in the order of about 30%), but increases the beam quality, defined as the ability of the beam to be focused on a very small spot. In the example of an embodiment, the laser beam available at the outlet U2 has a power 4 kW and a BPP in the order of 3 mm·mrad.

As already indicated, in the above description and in the attached drawings, construction details of the illustrated components are not provided, as they can be made in any known way, and because their elimination from the drawings renders the drawings simpler and easier to understand.

According to another prior art, all of the laser source functions are controlled by an electronic control unit (not illustrated in FIGS. 1-4), which is associated with a man-machine interface of any known type.

Figure 5:
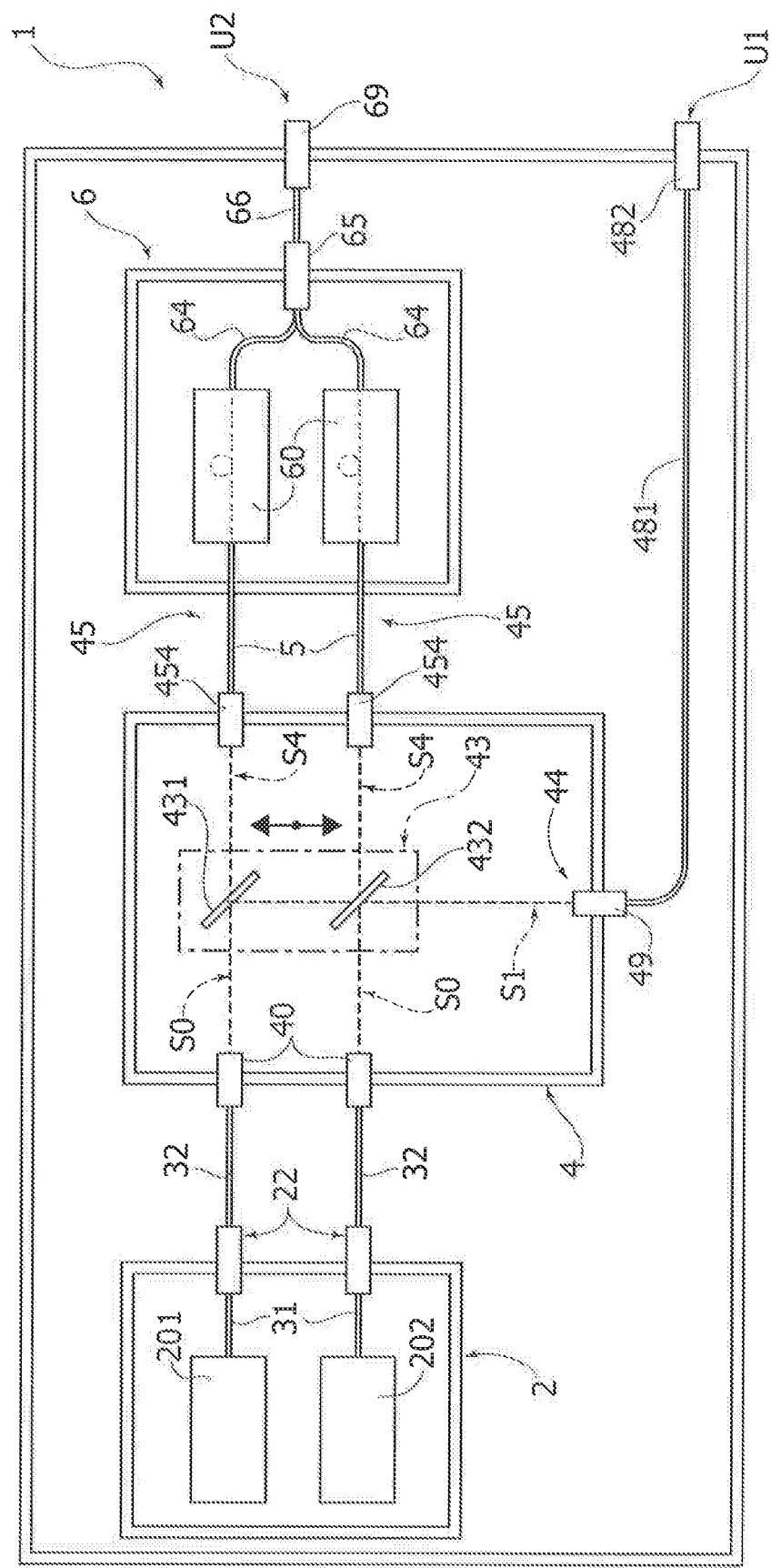
FIG. 5 is a schematic diagram of an embodiment of a laser source with two outlets according to the present invention.
Figure 6:
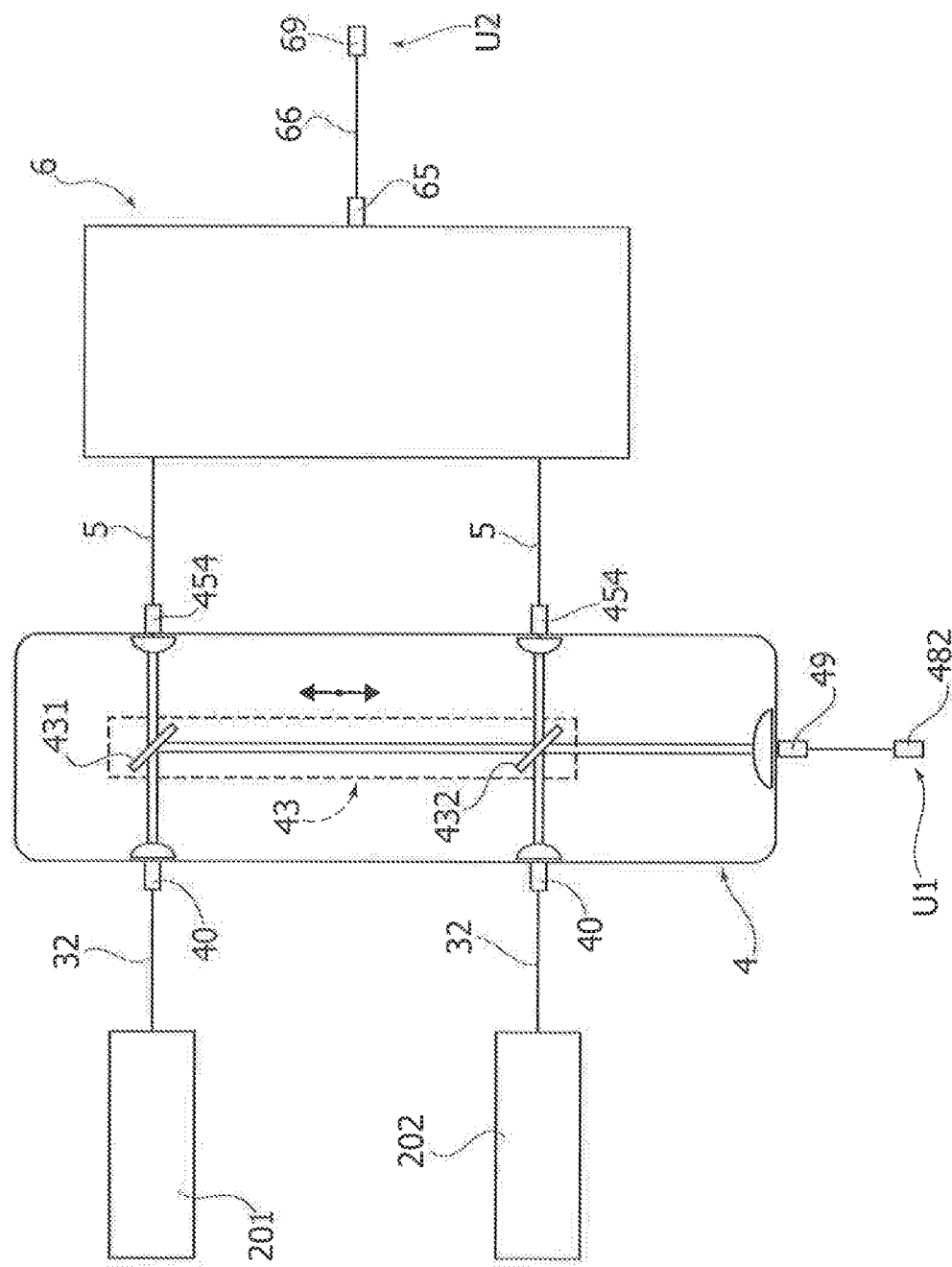
FIG. 6 is an enlarged schematic detail of a portion of FIG. 5.
Figure 7:
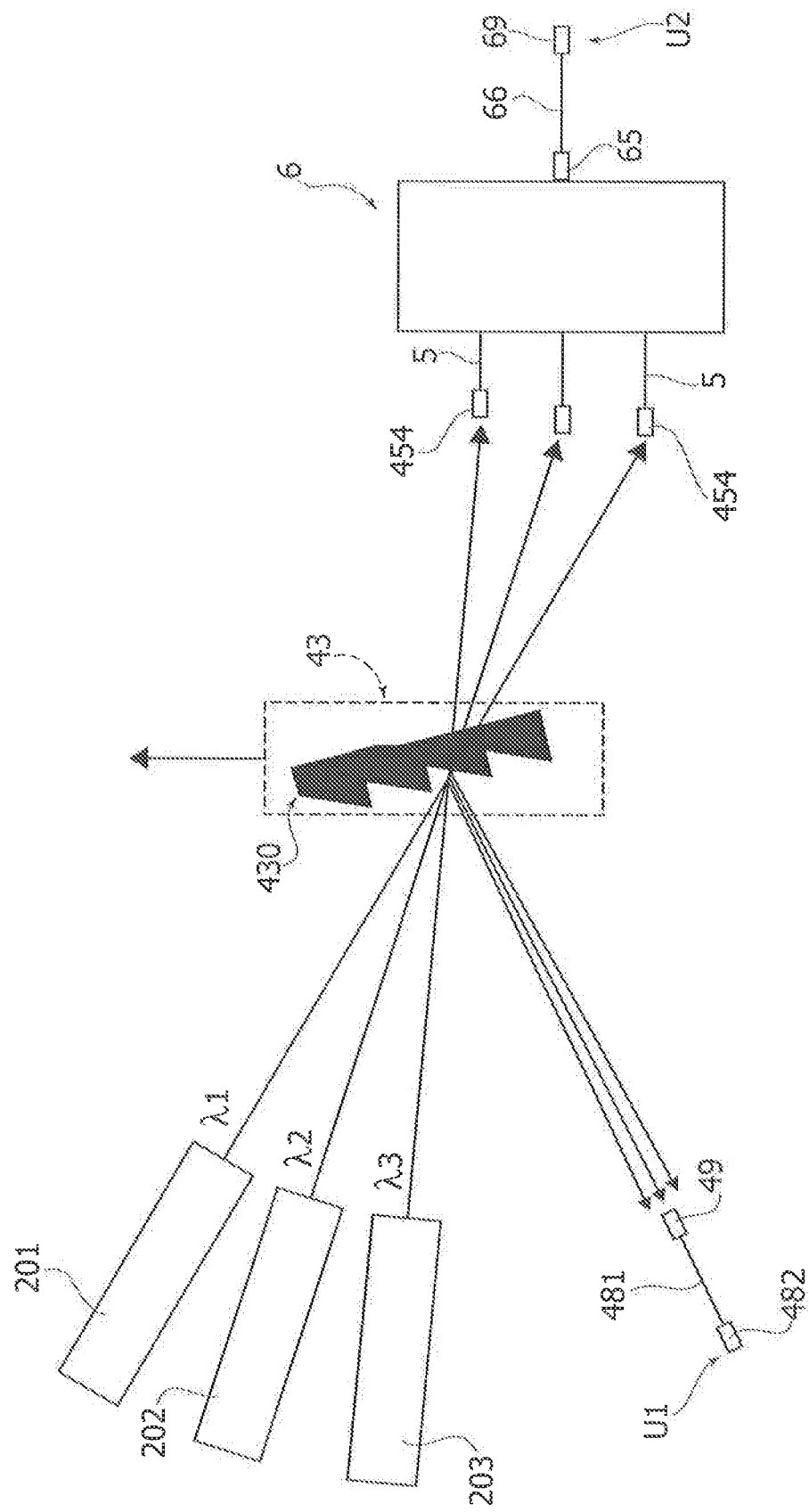
FIG. 7 shows an alternate embodiment of FIG. 6.

FIGS. 5-7 of the attached drawings show an example of an embodiment of the laser source according to the present invention. In these figures, the parts common or corresponding to those of FIGS. 1-4 are indicated by the same reference numbers.

A first important difference of the invention compared to the solution of FIGS. 1-4 resides in the fact that, in this example, the generating unit 2 comprises a plurality of diode laser sources capable of generating laser beams of different wavelengths. Purely by way of example, FIG. 5 shows a unit 2 constituted by two diode laser sources 201, 202, but it must be noted that there can be any number of diode laser sources. In a one example, the sources 201, 202 emit laser beams with wavelengths of 920 nm and 950 nm, respectively. Diode laser sources with these wavelengths are readily available commercially. However, there is no preclusion to adopt different wavelengths, in particular optimized wavelengths for optimal operation of the amplifier modules 60, such as wavelengths in the region of 975 nm.

The outlets of diode laser sources 201, 202 are connected by means of optical fibers 31 to optical connectors 22 of any known type, constituting the outlets of the unit 2. The connectors 22 are connected via respective optical fibers 32 to two optical interfaces 40 constituting the inlets of the switching and addressing unit 4, through which the laser beams coming from the sources 201, 202 propagate in the free space S within the unit 4.

In the example illustrated in FIGS. 5 and 6, the selector device 43 comprises a number of mirrors equal to the number of diode laser sources, in the specific case, two mirrors 431, 432, aligned in a direction S1 orthogonal to the directions S0 of the outgoing laser beams from the optical interfaces 40. The mirrors 431, 432 are jointly movable in the direction S1 between a position of interception of the laser beams coming from the diodes 201, 202 and a position in which these laser beams are not intercepted. For greater clarity, the drawings do not illustrate the support structure of the mirrors, or the actuator device of their movement, which can be of any known type, preferably electrically-operated.

The first mirror 431 is a totally reflecting mirror for a laser beam having the wavelength of the diode 201. It then reflects the laser beam coming from the diode 201 when the selector device 43 is in the aforesaid position of interception. The mirror 432 is a totally reflecting mirror for a laser beam having the wavelength of the diode 202 and is permeable to a laser beam with a different wavelength. Therefore, when the selector device 43 is in the aforesaid position of interception, the mirror 432 reflects the laser beam coming from the diode 202, while being crossed by the laser beam reflected by the mirror 431. The two laser beams reflected in the direction S1, having different wavelengths, are then combined into a single laser beam, in an at least partially overlapping position. This single laser beam propagates in the free space S within the unit 4 until reaching an optical interface 49 of the optical line 44 that is connected to the first outlet U1 of the laser source 1. The optical interface 49 is connected via an optical fiber 481 to the first outlet U1, constituted by an optical connector 482. The possibility of obtaining a single laser beam at the first outlet U1 constituted by the at least partial overlapping of laser beams with different wavelengths allows the BPP of this laser beam to be decreased, or rather, the quality to be increased.

Of course, in the case that more than two diodes are provided, the mirrors of the device 43 are provided in equal numbers and are each configured to be fully reflective to a laser beam having the wavelength of the respective diode. Moreover, apart from the first mirror of the series, every other mirror must be permeable to the laser beams having different wavelengths from the wavelength to which this mirror is reflective.

When the selector device 43 is in the position in which the laser beams of the diodes 201, 202 are not intercepted, these laser beams propagate in the space S in directions S4 until reaching the optical interfaces 454 at the outlet of the unit 4. The optical interfaces 454 belong to respective optical lines 45 that are connected to the second outlet U2 of the laser source. The optical interfaces 454 are connected by means of optical fibers 5 to the amplifier modules 60. The amplifier modules 60 have outlets connected to optical fibers 64 converging in an optical combiner 65 of any known type. The combiner 65 is connected via an optical fiber 66 to an optical connector 69 constituting the outlet U2 of the laser source 1.

FIG. 6 shows the switching and addressing unit 4 of FIG. 5 on an enlarged scale and in a schematic way, along with the diodes 201, 201, the amplification unit 6 and the two outlets U1, U2 of the laser source 1.

FIG. 7 shows an alternate example in which the selector device 43 comprises a diffraction grating 430 movable between a first position (illustrated in the figure), towards which the laser beams of three diodes 201, 202, 203, having different wavelengths, are made to converge, and a second position, in which said diffraction grating 430 does not intercept said laser beams, which can thus proceed towards three inlets or interfaces 454 of the amplification unit 6 and from here to the outlet second U2 of the laser source. In its position of interception, the diffraction grating 430 causes diffraction of the laser beams in the direction of the optical interface 49 connected to the first outlet U1 of the laser source.

Figure 8:
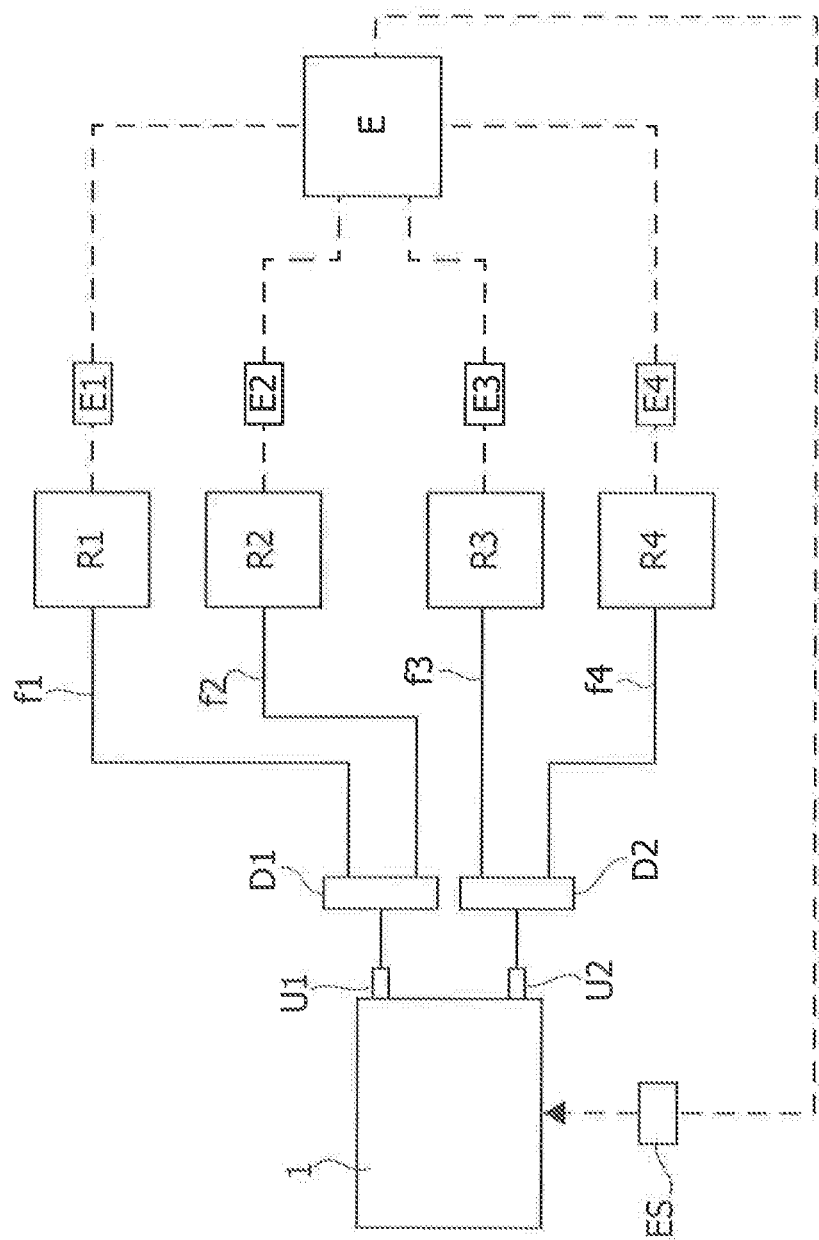
FIGS. 8 and 9 are schematic diagrams of two alternate industrial plants using one or more laser sources according to the invention.

FIG. 8 shows schematically an example of an industrial plant, which is already the subject of the previous application of the Applicant, cited above. However, this plant is also usable with the laser source according to the invention. The example illustrated relates to the case of a production plant for motor vehicles, comprising a plurality of laser processing cells or stations, R1, R2, R3, R4. For example, the plant comprises a station R1 in which an operation of laser brazing is performed (a typical case is that of connecting a roof to a motor-vehicle body), a station R2 where an operation of laser welding on a component is performed (for example the structure of a motor-vehicle door), a station R3 where an operation of laser cutting is performed, for example, to form an opening in a wall of the motor-vehicle body, and a station R4 where a remote laser welding operation is performed, namely with the laser torch maintained spaced-apart from the welding area.

In each processing station, a processing apparatus utilizing a laser beam is provided. For example, the apparatus can comprise one or more multi-axis manipulator robots, each provided with a laser torch connected by optical fiber to the laser source. Again by way of example, an electronic control unit E1, E2, E3, E4 is associated with each cell or station. An electronic supervision unit E communicates with the electronic units E1, E2, E3, E4.

The brazing, welding, cutting, and remote welding processes involve the use of an increasing quality laser beam (a lower quality is required for brazing and welding, while a higher quality is required for cutting and remote welding).

In the plant of FIG. 8, a laser source 1 is illustrated, conforming to the invention, which has been described above, with the two outlets U1, U2 connected, by means of optical distributors D1, D2 of any known type, to optical fibers f1, f2, f3, f4, which feed a respective laser beam to the apparatus arranged in the respective processing station or cell.

An electronic control unit ES of the selector device 43 of the laser source 1 activates the outlet U1 or the outlet U2 of the source 1 on the basis of signals coming from the supervisor unit E, in order to perform the processing in the cells R1, R2 or in the cells R3, R4.

Figure 9:
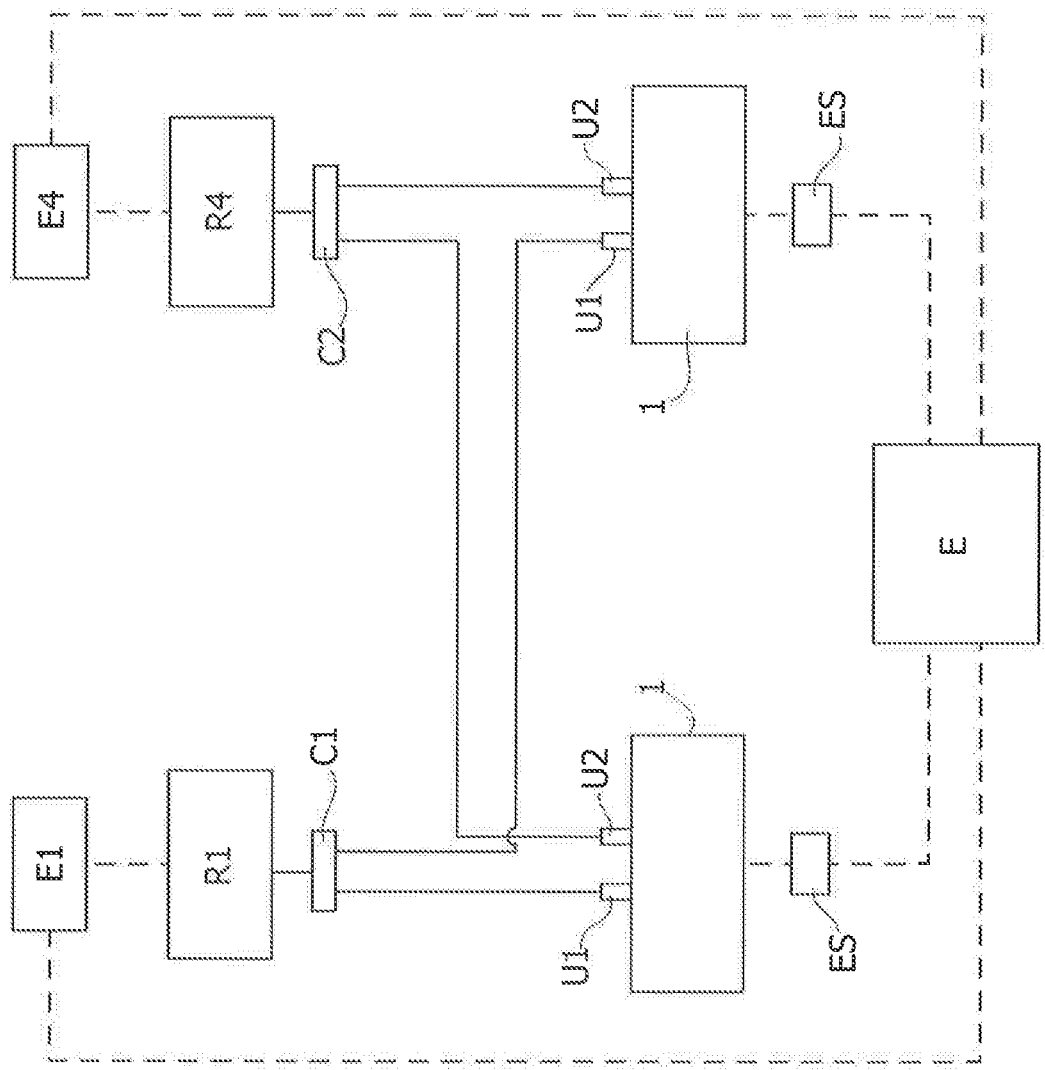

Even more advantageously, for example, two sources 1 according to the invention can be provided, one dedicated to one or more cells R1, R2 and the other to one or more cells R3, R4. This solution is shown schematically in FIG. 9, where two sources 1 according to the invention each have their two outlets U1, U2 connected in a crossed manner, one to a cell R1 and the other to a cell R4. The optical fiber entering each cell is connected to the two optical fibers coming from two different sources by means of three-way connectors C1, C2. The plant of FIG. 9 has also already been illustrated in the previous application by the Applicants, but it is illustrated again here as it is also usable with the laser source according to the invention.

The supervisor unit E controls the electronic units ES of the sources in such a way that normally the left laser source (as pictured in FIG. 9) has its outlet U1 activated to feed the cell R1, while the other source 1 has its outlet U2 activated to feed the cell R4 with a higher quality laser beam. However, in the case of failure of one source, the other source can be used temporarily to feed the cell whose source is faulty, after having switched the respective selector. This can be useful, for example, when a failure on the source of the cell R4 justifies interrupting the processing in the cell R1 and using the source of R1 as a back-up source for R4.

The diagrams illustrated are only examples, and it is clear that the configuration and arrangement of the cells and of the relative laser sources can be varied at will, according to the requirements of specific applications.

The laser source according to the invention can also be associated with a single processing cell for feeding laser beams of different characteristics to different laser devices provided in the same cell, in order to perform different laser processing within the same cell.

Of course, without prejudice to the principle of the invention, the details of construction and the embodiments may vary widely with respect to those described and illustrated purely by way of example, without departing from the scope of the present invention.

The invention claimed is:

1. A laser source, particularly for use in industrial processes, comprising:
   a laser beam generating unit including at least two laser diodes for generating at least two laser beams;
   an optical amplification unit including at least two amplifier modules configured to be respectively pumped with said at least two laser beams emitted by said at least two laser diodes and operable to emit laser beams having a higher beam quality and a lower power value with respect to said at least two laser beams emitted by said at least two diodes; and
   laser beam switching and addressing optical unit, interposed between said generating unit and said optical amplification unit, for selectively switching and addressing the at least two laser beams emitted by said at least two diodes, said optical switching and addressing unit comprising:
      at least two inlets operable to respectively receive said at least two laser beams emitted by said at least two diodes;
      a first optical line operable to forward a single laser beam which is obtained from the at least two laser beams emitted by said at least two diodes towards a first outlet of said laser source;
      at least two second optical lines for forwarding the at least two laser beams emitted by said at least two diodes towards said at least two amplifying modules of said optical amplification unit, said at least two amplifier modules having respective outlets connected to optical lines all converging towards a second outlet of said laser source; and
      an optical path selector device operable to selectively direct said at least two laser beams emitted by said at least two diodes towards one of:
         said first optical line, so as to generate the emission of a single laser beam with a relatively higher power and a relatively lower quality at said first outlet of said laser source; or
         said at least two second optical lines and through said at least two amplifier modules towards said second outlet of the laser source, so as to generate the emission of a single laser beam with a relatively lower power and a relatively higher quality at said second outlet of the laser source,
      wherein said at least two diodes are further configured to emit laser beams having different wavelengths from each other, and
      wherein said selector device further comprises a first operating position in which it forwards the at least two laser beams emitted by said at least two diodes towards said second optical lines (45), and a second operating position in which the laser beams emitted from said diodes (201, 202) are made to converge into a single beam, in a condition in which said beams emitted by said diodes are at least partially overlapping with each other.

2. The laser source of claim 1, wherein said selector device further comprises at least two mirrors aligned along a direction of said first optical line and jointly movable between a first position in which they respectively intercept said at least two laser beams emitted by said at least two diodes and a second position in which said at least two mirrors do not respectively intercept said at least two laser beams, wherein in said second position, said at least two laser beams can respectively proceed towards said at least two second optical lines and towards said at least two amplifying modules, and
   wherein when the at least two mirrors are in said first position, the first of said at least two mirrors reflects a first of said at least two laser beams having a first wavelength emitted by a first of the at least two diodes in a direction of said first optical line and through a second of the at least two mirrors, and wherein the second mirror is operable to reflect a second of the at least two laser beams having a second wavelength emitted by a second of the at least two diodes and to be permeable instead to the first laser beam from the first diode having a different wavelength than the second laser beam.

3. The laser of claim 1, wherein said selector device further comprises a diffraction grating selectively movable between a first position in which the at least two laser beams emitted by said at least two diodes are made to converge, and a second position in which said diffraction grating does not intercept said at least two laser beams, wherein in said second position, said at least two laser beams can proceed towards said at least two second optical lines and towards said at least two amplifying modules, and
   wherein said first position, said at least two laser beams are diffracted in a direction of said first optical line.

4. The laser source of claim 1, wherein each of said at least two amplifier modules further comprises at least one active optical fiber including active material operable to amplify the respective laser beam that enters into said respective module.

5. The laser source according to claim 1, wherein the generating unit further comprises at least two outlets in communication with the respective at least two diodes, said at least two outlets in communication with at least two respective inlets of said optical switching and addressing unit through respective inlet optical fibers.

6. The laser source of claim 5, wherein said optical switching and addressing unit defines a free space for propagating said at least two laser beams emitted by said at least two diodes within which said optical path selector device is interposed, said at least two inlets of the switching and addressing unit comprising optical interfaces that receive respective of the at least two laser beams from said at least two diodes and transmit them into said free space in which said optical path selector device (43) is positioned.

7. The laser source of claim 5, wherein said optical switching and addressing unit further comprises an outlet optical interface positioned along said first optical line, said outlet optical interface operable to receive said single laser beam obtained from said at least two laser beams emitted by said at least two diodes and to direct it into an outgoing optical fiber connected to said first outlet of the laser source.

8. The laser source of claim 5, wherein said optical switching and addressing unit further comprises at least two outlet optical interfaces positioned along said at least two second optical lines to receive said respective of the at least two laser beams emitted by said at least two diodes that propagate through said free space and to direct them into at least two outgoing optical fibers connected to respective of said at least two amplifier modules of said optical amplification unit.

9. The laser source according to claim 8, wherein at least two outlets of said at least two amplifier modules are connected to respective optical fibers converging into an optical combiner device connected to said second outlet of said laser source.

10. The laser source of claim 7, wherein said optical switching and addressing unit further comprises at least two outlet optical interfaces positioned along said at least two second optical lines to receive said respective of the at least two laser beams emitted by said at least two diodes that propagate through said free space and to direct them into at least two outgoing optical fibers connected to respective of said at least two amplifier modules of said optical amplification unit.

11. An industrial plant comprising:
    at least one laser source comprising:
        a generating unit including a first laser diode and a second laser diode;
        a selector addressing unit having an optical path selector device including at least two mirrors selectively movable between a first position for intercepting respective laser beams from the first and the second laser diode thereby selectively directing the laser beams along at least one of a first laser path toward a first outlet or a second position not intersecting the respective laser beams thereby directing the laser beams along a second laser path toward a second outlet, the first outlet providing a first laser beam having a relatively higher power and a relatively lower quality, the second outlet providing a second laser beam having a relatively lower power and a relatively higher quality;
        an optical amplification unit positioned between the selector addressing unit and the second outlet along the second laser path, the optical amplification unit including at least two amplification modules configured to be pumped with respective laser beams from the first and second laser diodes;
    at least one laser processing cell having a processing apparatus selectively operable to provide the first laser beam or the second laser beam.

12. A method for controlling a first laser processing cell and a second laser processing cell, the first laser processing cell having a first laser source and the second laser processing cell having a second laser source, each of the first and the second laser processing cells having a processing apparatus, the method comprising:
    generating in a first laser source a first laser beam and a second laser beam from a respective first and second laser diode;
    generating in a second laser source a first laser beam and a second laser beam from a respective first and second laser diode;
    each of the first and the second laser sources directing the respective first and the second laser beams into a respective selector addressing unit having an optical path selector device;
    each of the first and the second laser sources one of:
        combining the respective first and second laser beams into a combined first laser beam for direction along a first laser path toward a first outlet, the combined first laser beam having a relatively higher power and lower quality; or
        directing the respective first and the second laser beams along a second laser path toward an optical amplification unit and thereafter combining the first and the second laser beams into a combined second laser beam toward a second outlet, the combined second laser beam having a relatively lower power and a relatively higher quality compared to the combined first laser;
    connecting the first outlet of the second laser source to a first laser processing cell;
    connecting the second outlet of the first laser source to a second laser processing cell; and one of:
        directing the second laser source to provide the combined first laser beam from the first outlet to the first laser processing cell on detecting a failure of the first laser source; or
        directing the first laser source to provide the combined second laser beam from the second outlet to the second laser processing cell on detecting a failure of the second laser source.

* * * * *